(12) United States Patent
Brusselback

(10) Patent No.: US 11,945,412 B1
(45) Date of Patent: Apr. 2, 2024

(54) BIKE LIFTING CARGO RACK FOR VEHICLES

(71) Applicant: Lawrence James Brusselback, Newport, OR (US)

(72) Inventor: Lawrence James Brusselback, Newport, OR (US)

( * ) Notice: Subject to any disclaimer, the term of this patent is extended or adjusted under 35 U.S.C. 154(b) by 0 days.

(21) Appl. No.: 18/463,562

(22) Filed: Sep. 8, 2023

(51) Int. Cl.
  *B60R 9/10* (2006.01)
  *B60R 9/042* (2006.01)
(52) U.S. Cl.
  CPC ............. *B60R 9/10* (2013.01); *B60R 9/042* (2013.01)
(58) Field of Classification Search
  CPC ....... B60R 9/10; B60R 9/0426; B60R 9/0423; B60R 9/042
  See application file for complete search history.

(56) References Cited

U.S. PATENT DOCUMENTS

| | | | |
|---|---|---|---|
| 4,728,244 A | 3/1988 | Stokkendal | |
| 5,360,150 A | 11/1994 | Praz | |
| 5,398,778 A * | 3/1995 | Sexton | B60R 9/0423 224/310 |
| 5,544,796 A | 8/1996 | Dubach | |
| 5,709,521 A | 1/1998 | Glass et al. | |
| 6,149,039 A * | 11/2000 | Englander | B60R 9/042 224/310 |
| 6,360,930 B1 * | 3/2002 | Flickenger | B60R 9/0423 224/310 |
| 6,638,000 B2 * | 10/2003 | Groves | B60R 9/042 224/924 |
| 9,193,304 B2 * | 11/2015 | Svaldi | B60R 9/042 |
| 10,040,402 B1 * | 8/2018 | Brusselback | B60R 9/042 |
| 2021/0300255 A1 * | 9/2021 | Bouchard | B60R 9/048 |

FOREIGN PATENT DOCUMENTS

| | | | | | |
|---|---|---|---|---|---|
| DE | 3335173 A | * | 4/1985 | ............. | B60R 9/042 |
| DE | 10231625 A1 | * | 2/2004 | ............. | B60R 9/042 |

* cited by examiner

*Primary Examiner* — Scott T McNurlen
(74) *Attorney, Agent, or Firm* — Harpman & Harpman

(57) ABSTRACT

A vehicle roof top bicycle carrier and lifting apparatus has a roof rack with a power bike lift assembly pivotally secured thereto. Multiple interlinked pivoted linkage elements have a bike receiving boom extension pivotally secured to the roof rack. A remote-control power lift cylinder pivotally engages the linkage elements deploying the lift boom for lifting and attach bike to the roof rack for transport.

6 Claims, 7 Drawing Sheets

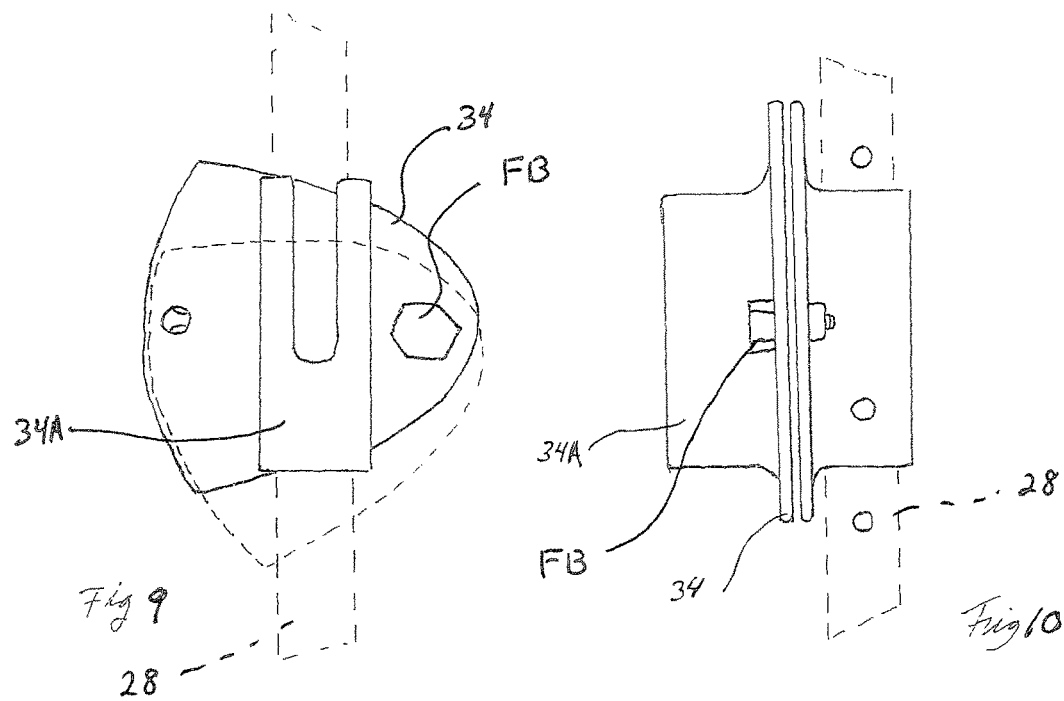
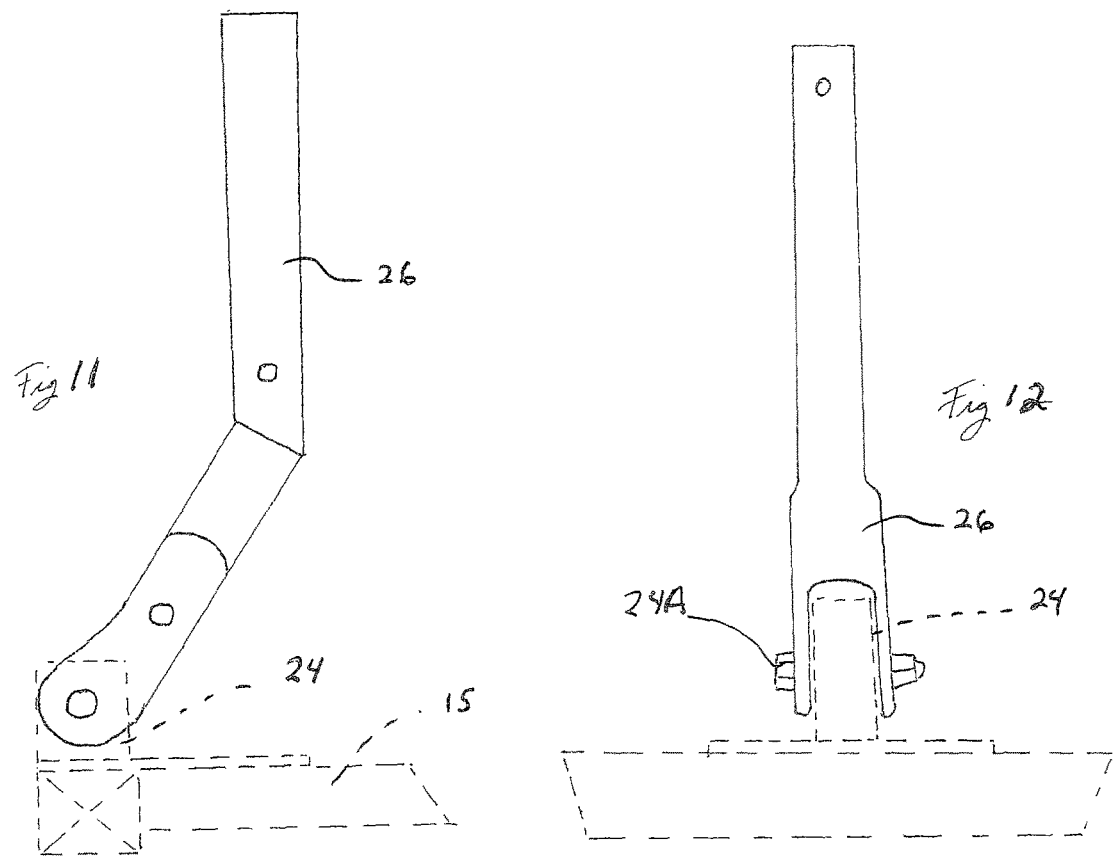

BIKE LIFTING CARGO RACK FOR VEHICLES

BACKGROUND OF THE INVENTION

1. Technical Field

This invention relates to bicycle carriers for vehicle rooftop attachment.

2. Description of Prior Art

A variety of prior art devices have been developed for bicycle transportation on vehicles including bike racks extending from the rear of vehicles and roof racks for bike transport.

Examples of such prior art devices can be seen U.S. Pat. Nos. 4,728,244, 4,887,758, 5,360,150, 5,544,796, 5,709,521, 6,638,000 and applicant's own U.S. Pat. No. 10,040,402.

In U.S. Pat. No. 4,728,244, a combined roof rack and cart is disclosed. The roof rack frame has rollers and is selectively deployed on a support shaft extending down along the side of the vehicle.

U.S. Pat. No. 4,887,758 is directed to a portable device for retaining a bicycle in conjunction with a conventional sports equipment transport rack on the roof of a vehicle. It is configured to hold the bike beside the vehicle for repairs.

U.S. Pat. No. 5,360,150 claims a roof rack for vehicles having a pivoting/sliding extension to lower the load laterally of the vehicle. The load remains horizontal during its repositioning.

U.S. Pat. No. 5,544,796 discloses a roof rack for vehicles having a pair of spaced parallel tracks that pivot out and extend downwardly along the side of the vehicle for placement of sleighs thereon for transport.

U.S. Pat. No. 5,709,521 is directed to a lift assist bicycle carrier for car roof tops and adjustable column standards has a lift bar central end pivot for a roof top mounted rack with a power stroke lift device to transfer power to the column standard to assist in raising the attached bike on the end of the arm.

U.S. Pat. No. 6,638,000 describes a bicycle lift for a vehicle roof rack having a lift arm holding a bike to a rotatable shaft on the roof. A crank or motorized mechanism empowers a gear drive to rotate the shaft lifting the arm while the bike is attached to the roof rack.

Applicant's U.S. Pat. No. 10,040,402 is directed to a bike lifting cargo rack for vehicles which provides a lifting apparatus that assist in positioning a bicycle on the roof rack using pneumatic lifting springs, pivoted boom assemblies interconnected by pivot linkages.

SUMMARY OF THE INVENTION

A lift device for bicycle loading and unloading to a vehicle roof to a bike transport rack on the vehicle in upstanding position. A bike receiving and holding boom arm assembly is connected to a dual armature link assembly having a single lift power cylinder connected thereto. The boom has a pivoted extension with a bike bracket receiving insert selectively positioned and receiving a bike. The interlinkage armature provided boom pivot extensions and load management with remote access for control and power of the power lift cylinder.

DESCRIPTION OF THE DRAWINGS

FIG. 9 is an enlarged side elevational view of an adjustable receiving lift fitting.

FIG. 10 is an end elevational view thereof on lines 10-10 of FIG. 9.

FIG. 11 is an enlarged side elevational view of a boom mounting bracket.

FIG. 12 is an end view on lines 12-12 of FIG. 11.

DETAILED DESCRIPTION OF THE INVENTION

Figure 1:
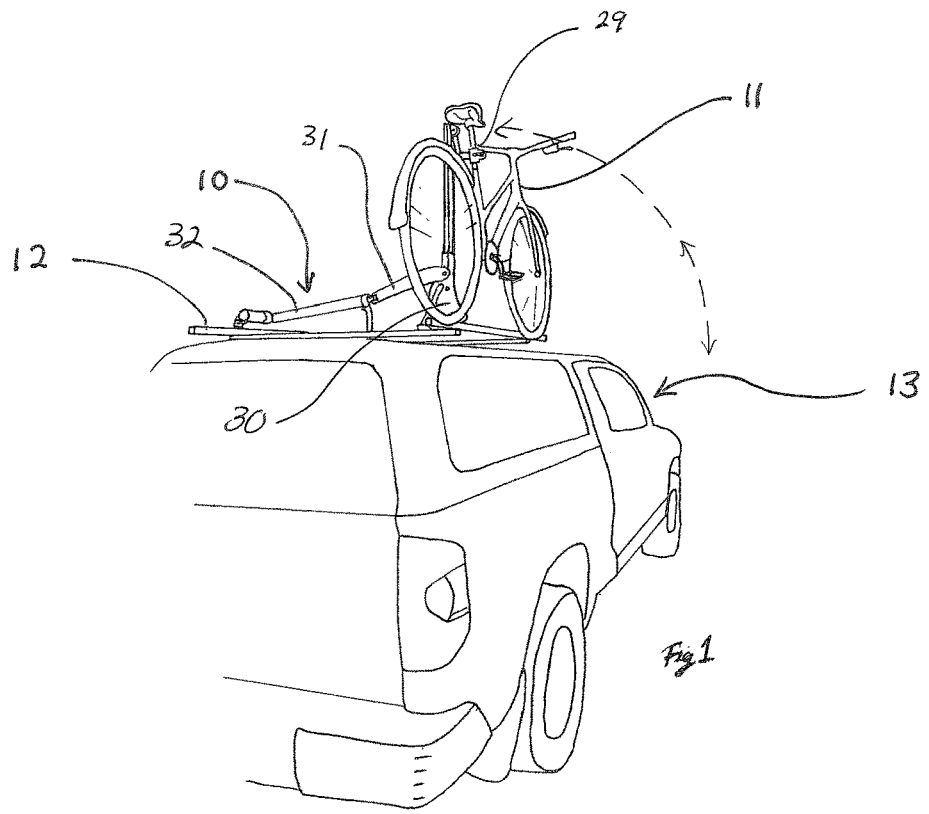
FIG. 1 is a perspective view of the invention on a vehicle with a bike on a bike lift on the roof of the vehicle.

Referring now to FIGS. 1-5 of the drawings, a bike lifting rack assembly 10 can be seen for lifting and mounting a bike 11 on a vehicle roof rack 12 positioned on a vehicle 13. The bike roof rack frame 12 has a pair of spaced parallel tubular side support elements 14 and 15 with spaced interconnecting end support elements 16 and 17 with a supportive list pair of main parallel cross lift assist support tubular elements 18 and 19 extending there between interconnected by a pair of transverse connectors 20.

Figure 2:
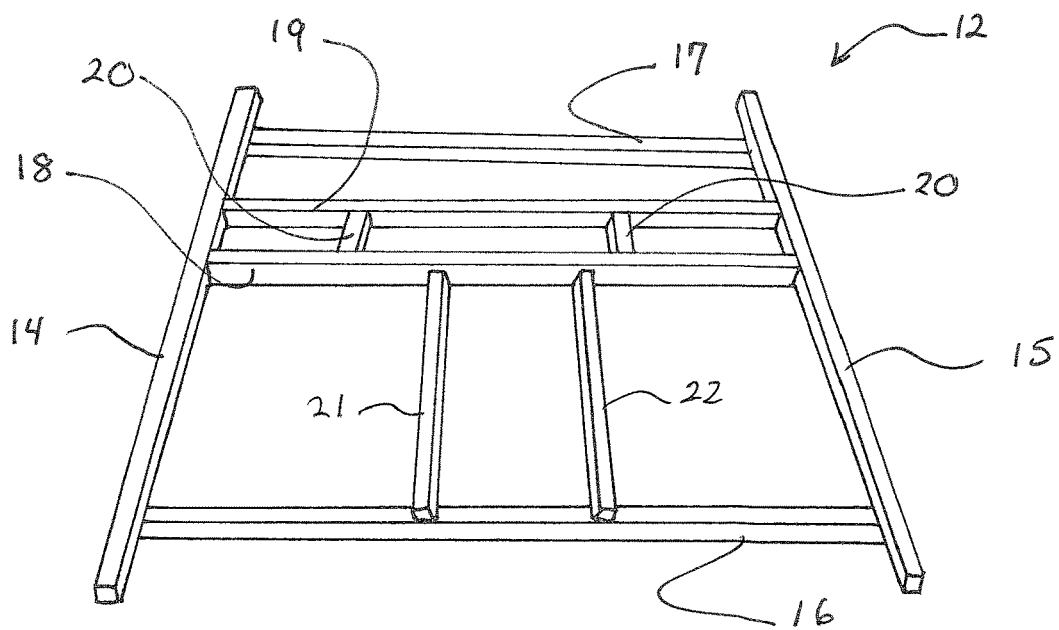
FIG. 2 is a perspective view of a bike cargo rack of the invention.

A secondary pair of stabilizer support bars 21 and 22 extend between the end support element 16 and the lift support element 18, best seen in FIG. 2 of the drawings. It will be seen that the lift assembly 10 is removably secured to the roof of the vehicle 13 and any conventional roof rack mounting assembly available and well known within the art.

A powered bike lift assembly 23 is pivotally secured to the roof rack 12 at the intersection of the lift support element 18 and the rack element 15 in this example by an apertured pivot bracket 24 secured to the support element 18. A boom extension assembly 25 has an upstanding apertured tubular boom mounting bracket 26 with a longitudinally offset apertured engagement portion secured by a pivot pin 24A to said mounting bracket 24.

An upstanding cylindrical bike boom extension 27 retained by removable pin 27A extends through aligned apertures thereof. A bike engagement extension boom 28 is pivotally secured to the end of the bike extension boom 27 and has a plurality of spaced bracket receiving apertures A therein for adjustably receiving a bike bracket receiving fitting 29, best seen in FIGS. 9, 10 and 13 of the drawings and as will be discussed and disclosed in greater detail hereinafter.

Referring now to FIGS. 3-6 of the drawings, the bike lift assembly 23 can be seen having a pair of contoured interlinked linkage elements 30 and 31 with an electric power cylinder 32 in communication therewith. The linkage element 30 has two attachment points 33 for securing to the boom mounting bracket 26 and a single pivot point 33A that interconnects the linkage element 30 and 31 together with the boom mounting bracket 26 with a linkage pin 32A, best seen in FIG. 3 of the drawings.

The bike bracket receiving assembly 29 can provide adjustability along the length of the pivoted boom extension 28 which has a plurality of longitudinally spaced apertures A therein. The bike bracket receiving fitting 29 has an adjustable receiving sleeve fitting 34 which can be angularly adjusted indicated by adjustment arrows on a base by a fixation bolt FB as seen best in FIGS. 9 and 13 of the drawings. The adjustable receiving sleeve fitting 34 has a slotted bracket 34A for registration with a bike clamp fitting 36.

Figure 7:
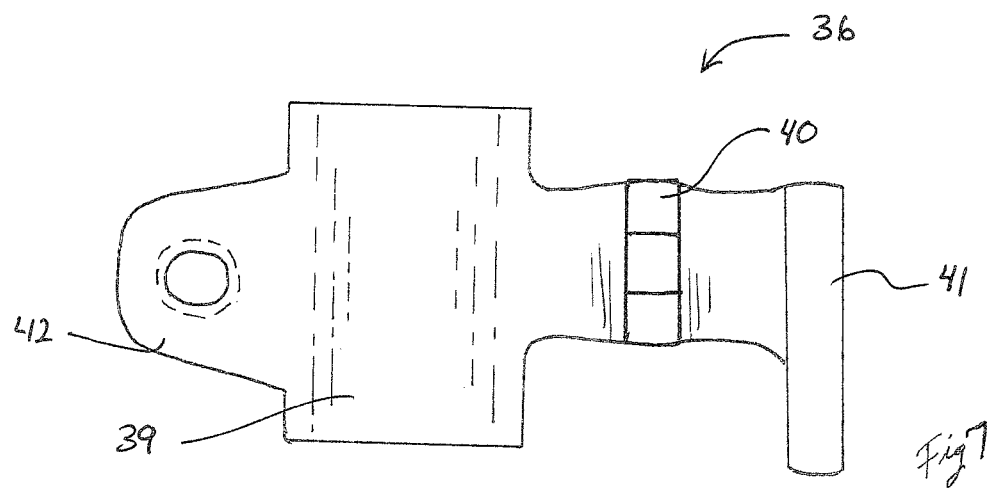
FIG. 7 is an enlarged side elevational view of a bike engagement clamp of the invention.
Figure 8:
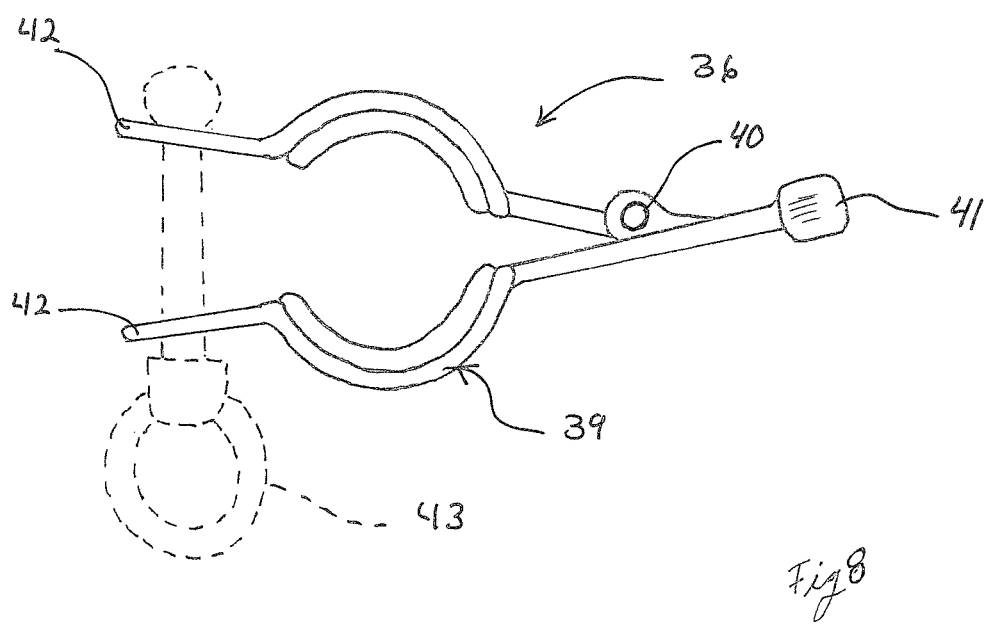
FIG. 8 is a top plan view thereof.
Figure 13:
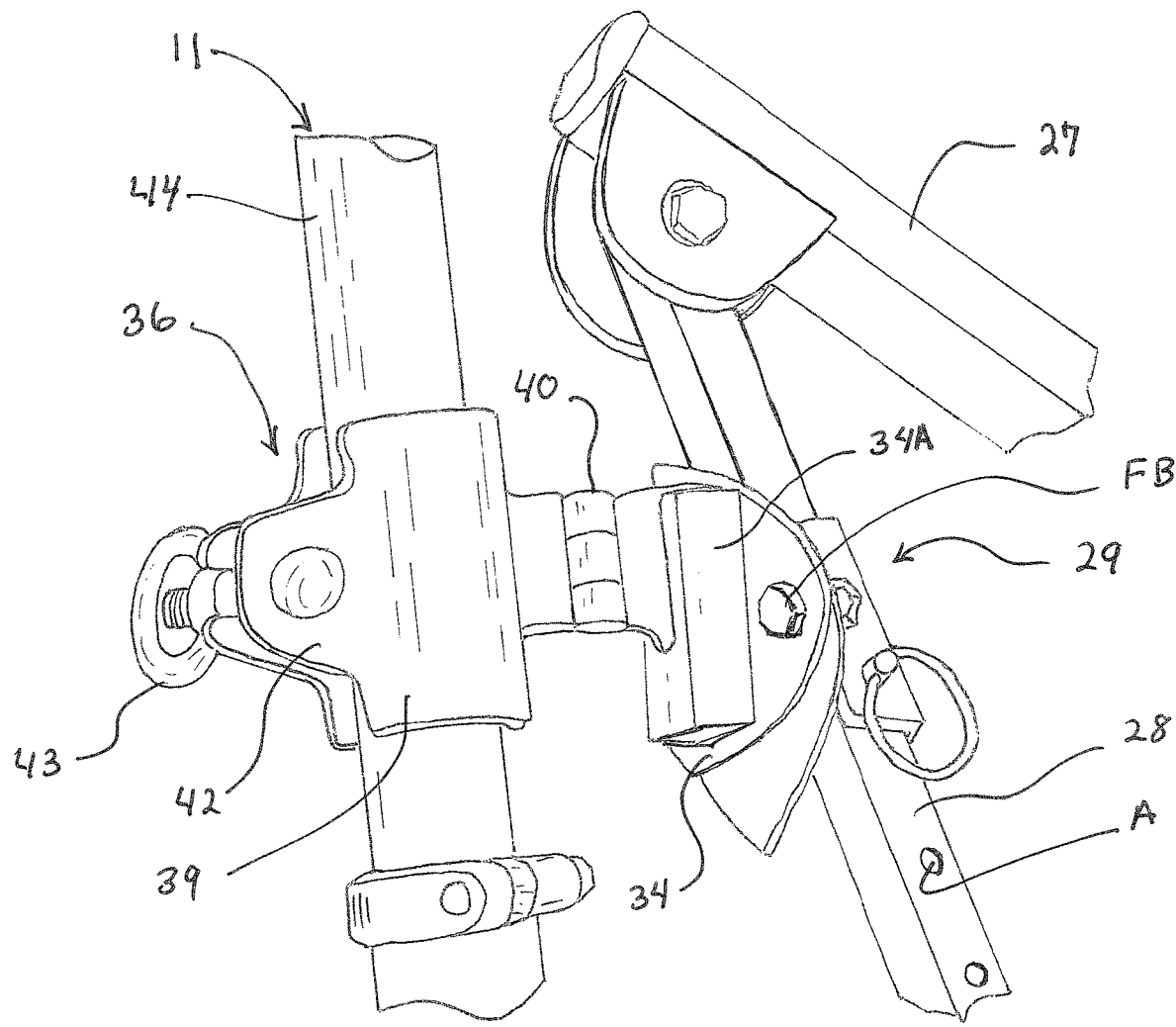
FIG. 13 is an enlarged partial perspective view of the bike clamp and bike receiving fitting mounted on a bike in a boom configuration engaged thereon for lifting.

The bike clamping fitting 36 has a split cylinder bike frame engagement clamp 39 hinged together by a hinge extension 40 with a mounting rod 41 extending therefrom. A pair of apertured locking tabs 42 extend from the respective split cylinders 39 with a retainment compression bolt 43, shown in broken lines, extending there through for clamping onto the tubular seat support frame 44 of the bike 11 as best seen in FIGS. 7, 8 and 13 of the drawings.

It will be evident from the above description that in operation, a bike 11 fitted with the bike clamping fitting 36 can be registerably engaged to the boom assembly extension 28 by insertion into the adjustable receiving assembly 34 with specific orientation of the rod 41 within the slotted bracket 34A.

Figure 3:
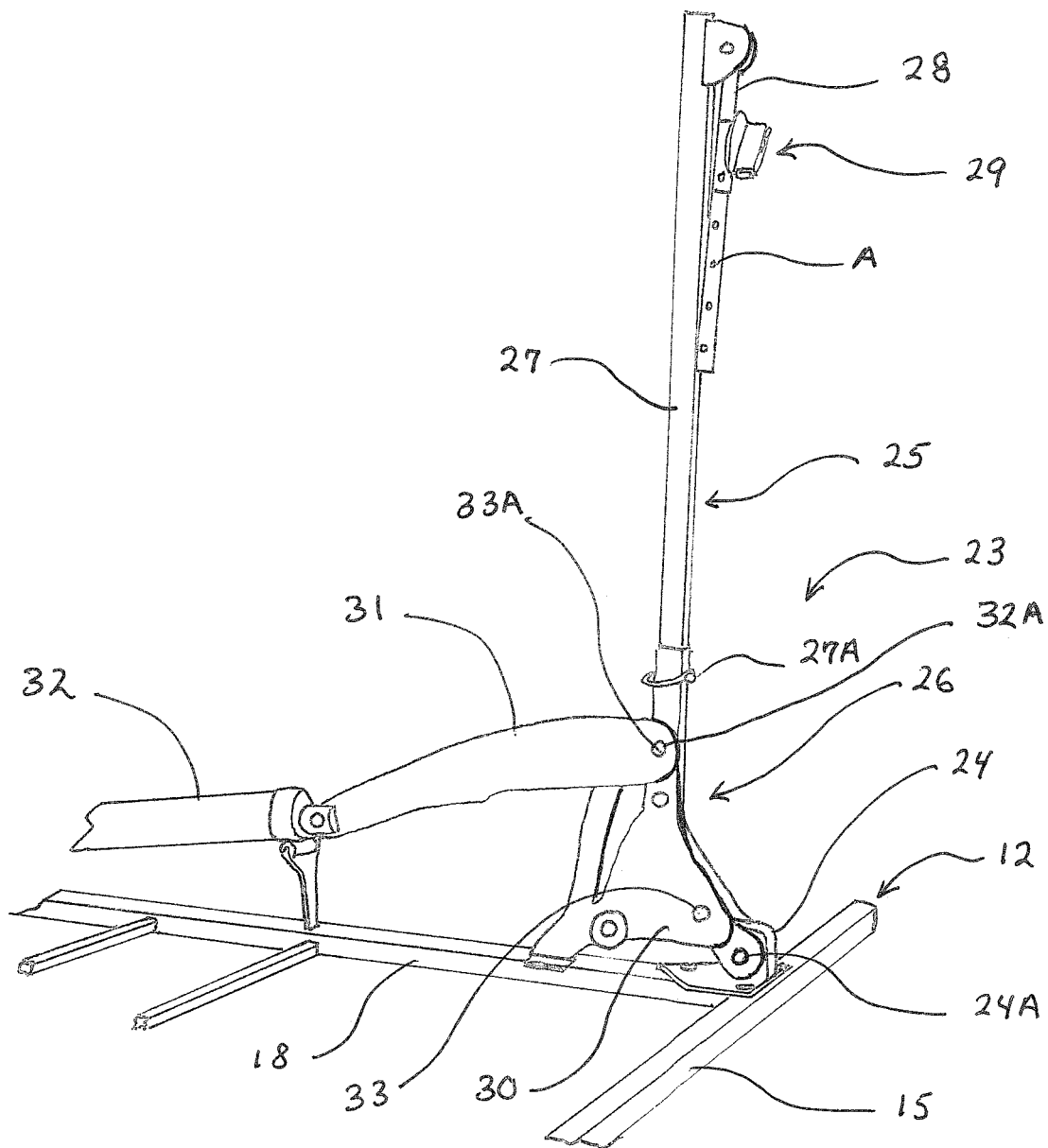
FIG. 3 is a partial perspective view of the invention in transport lift position without a bike.
Figure 4:
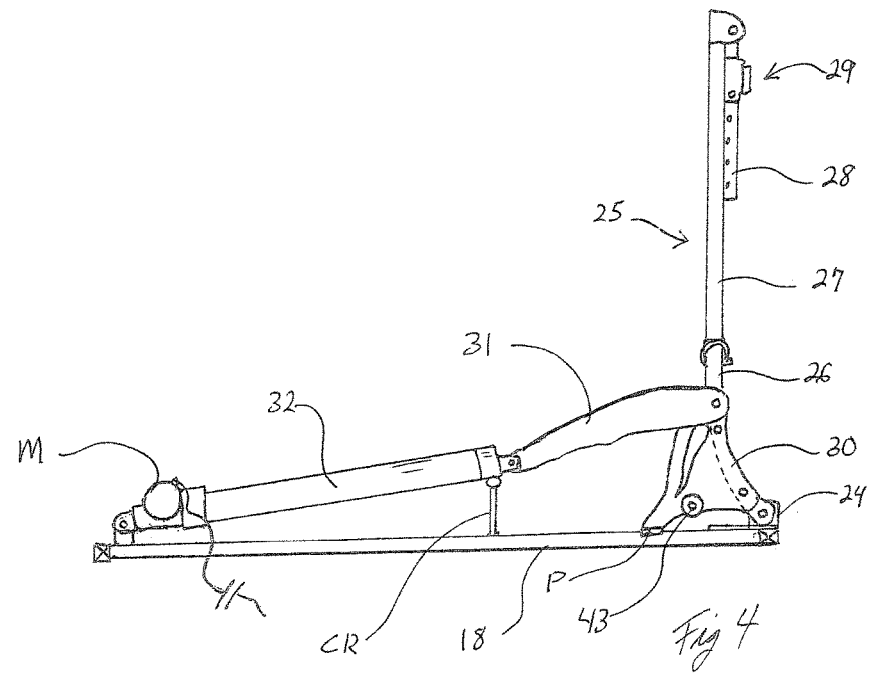
FIG. 4 is a side elevational view thereof with a control and power source graphically illustrated.

Referring back now to FIGS. 3-6 of the drawings, the bike lift assembly 23 can be seen in multiple select lift boom positions. In FIGS. 3 and 4 of the drawings, the linkage element 31 is secured to the power cylinder 32 rod 32A with the linkage element 30 resting on a pad P on the support element 18 and the power cylinder 32 on a cylinder rest CR.

Figure 6:
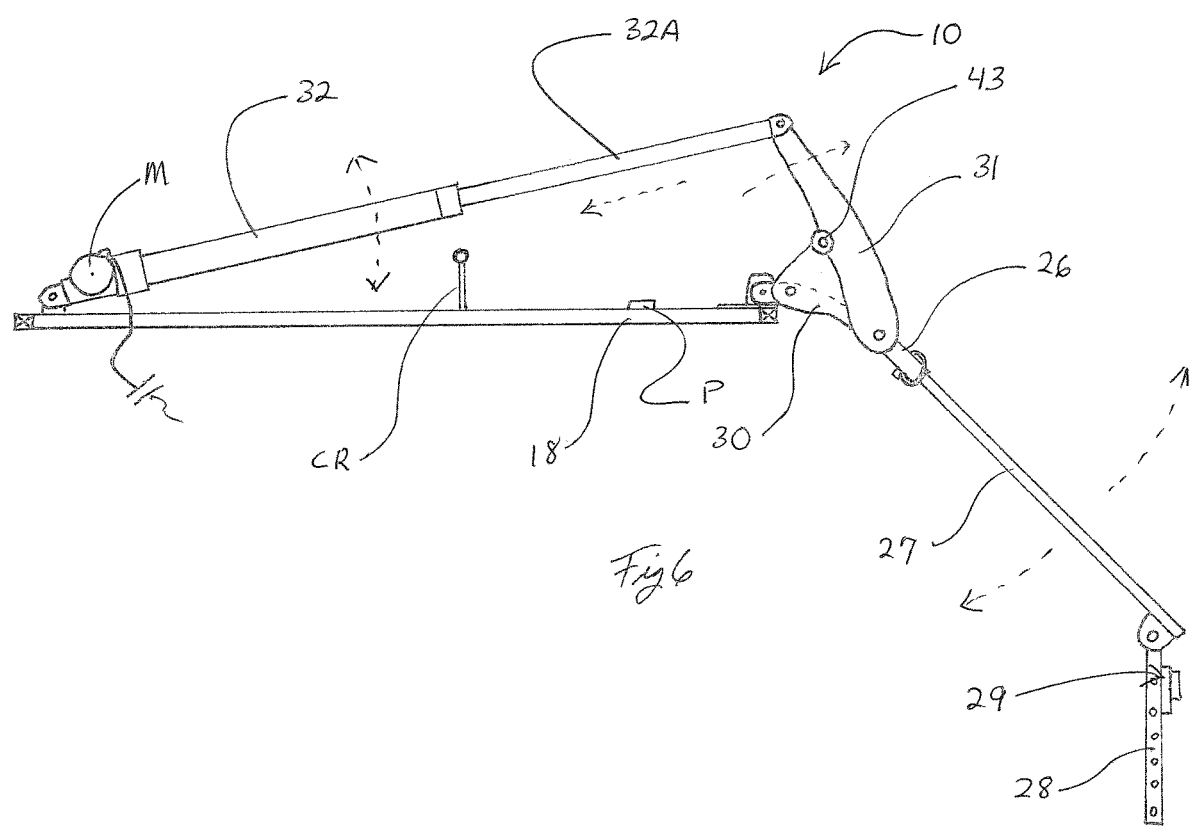
FIG. 6 is a side elevational view thereof in lowered bike access replacement position for loading or unloading.

Once activated, the electric power cylinder 32 and with piston rod 32A extends pivoting the linkage element 30 and the boom assembly 27 as seen in FIG. 6 of the drawings. A linkage engagement bearing 43 on the linkage element 30 pivots therewith and engages the linkage element 31 changing the angular inclination of the lifting cylinder rod 32A. This re-orientation allows for the combined linkage elements 30 and 31 to present the boom assembly 25 with the deployable end boom extension 28 to a bike receiving position as seen best in FIG. 6 of the drawings where the bike 11, not shown, can engage or disengage with the bike lift assembly as hereinbefore described.

The power cylinder 32, in this example, is powered by an electric motor M typical of those within the art. The linkage pivot points defined by articulation achieved to reposition the effective bike attachment and securing thereto as seen indicated graphically by pivot points A, B and C while the effective pivot of the linkage element 30 is activated by the pivot of the boom mounting bracket 26 which is, as noted, pivotally secured to the rack assembly 10 as hereinbefore described.

Figure 5:
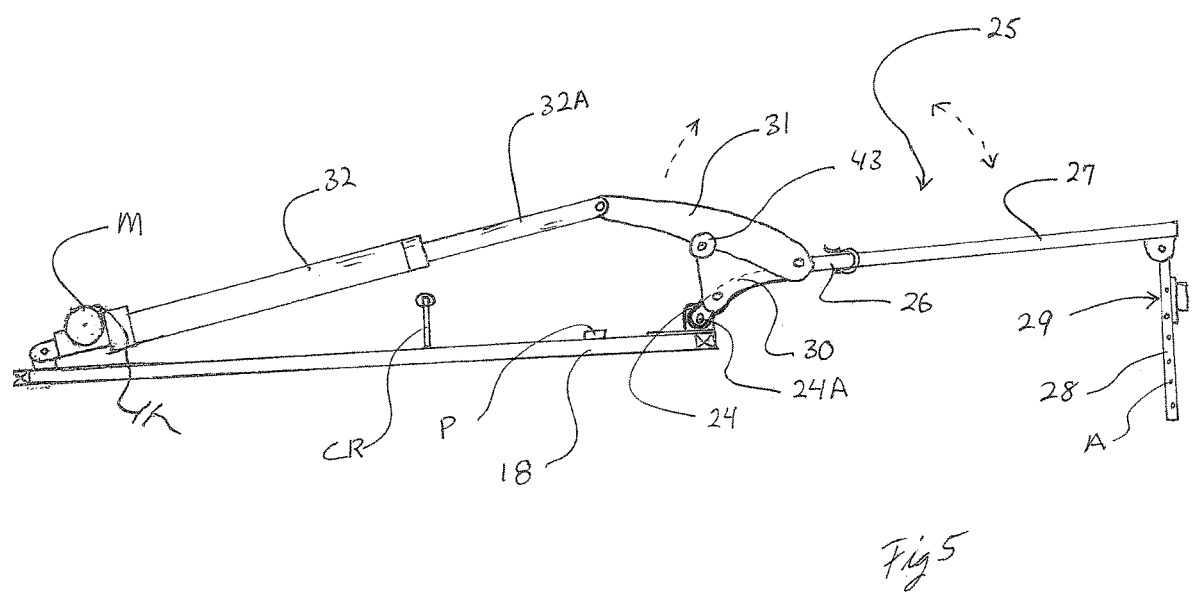
FIG. 5 is a side elevational view of the invention in mid lift or descent position.

In operation, as seen in FIG. 1 of the drawings, uses the remote control RC to activate the power lift cylinder 32 extending the cylinder rod 32A in communication with the second linkage element 31 thereby pivoting the first linkage element 30 on the boom mounting bracket 26 with the boom extension elements 27 from a vertical position illustrated in FIGS. 3 and 4 of the drawings to a midpoint position illustrated in FIG. 5 and finally a loading and unloading bike engagement position illustrated in FIG. 6 of the drawings.

This unique remote orientation and activation allows the user U to simply place the bike on the boom 28 by inserting the mounting rod 41 within the slotted bracket 34A securely and then reactivate the cylinder 32 thereby reversing the orientation of the linkage element 31 and 32 and the interconnected boom assembly 25 and lift the bike 11 back up to vertical secure and transport position illustrated in FIGS. 3 and 4 and graphically in FIG. 1 of the drawings for transport.

It will thus be seen that a new and novel bike lifting cargo rack has been illustrated and described and it will be apparent to those skilled in the art that various changes and modifications may be made therein without departing from the spirit of the invention. Therefore, I claim:

The invention claimed is:

1. A power bike lifting carrier for vehicles comprises,
a support rack on a vehicle, first and second booms pivotally attached in end-to-end relation, the first boom pivotally attached to said support rack for automatically raising and lowering a bicycle attached to said second boom in an upright position on said support rack, a bike engagement clamp adjustably secured to said second boom and selectively attached there to the bike,
a bike lifting linkage assembly secured to said first boom, said bike lifting linkage assembly comprising,
a first and second linkage body member, a power lift cylinder pivotally secured between said support rack and said second linkage body member, said second linkage body member pivotally secured to said first boom and pivotally secured to said first linkage body member,
a linkage engagement bearing on said first linkage body member for selective registration against said second linkage body member during lift activation.

2. The power bike lifting carrier set forth in claim 1 wherein said first linkage body member is pivotally secured to said second linkage body member in spaced relation to said power lift cylinder.

3. The power bike lifting carrier set forth in claim 1 wherein said bike engagement clamp comprises,
a receiving bracket adjustable for longitudinally mounting along said second boom and a clamping jaw engagement on a frame of said bike,
a hinge extension and mounting rod extending from said clamping jaw engagement for select registration within said receiving bracket.

4. The power bike lifting carrier set forth in claim 1 wherein said support rack comprises,
a pair of spaced parallel tubular support elements, a pair of interconnecting support elements and a pair of cross lift engagement elements between said spaced parallel tubular support elements and said interconnecting support elements.

5. The power bike lifting carrier set forth in claim 1 wherein said power lift cylinder has a remote control and a source of power.

6. The power bike lifting carrier set forth in claim 1 wherein said support rack has a first linkage body member engagement pad and a power lift cylinder upstanding rest in spaced relation to one another and in spaced relation to said first lift boom.

* * * * *